Feb. 19, 1935.  A. W. RALSTON  1,991,956
FATTY ACID CRACKING IN THE PRESENCE OF AROMATIC AMINES
Filed May 25, 1934
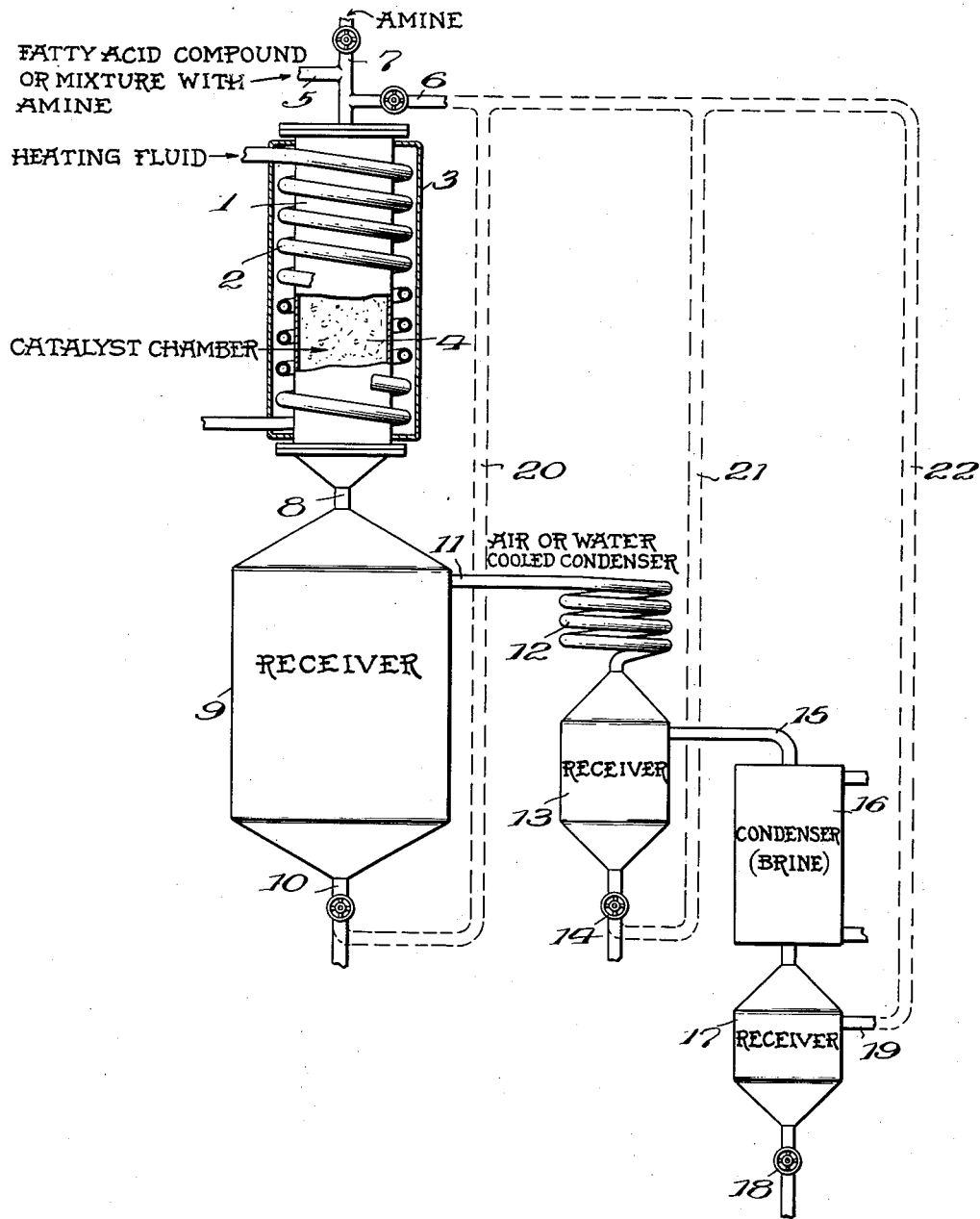

Patented Feb. 19, 1935

1,991,956

UNITED STATES PATENT OFFICE 1,991,956

FATTY ACID CRACKING IN THE PRESENCE OF AROMATIC AMINES

Anderson W. Ralston, Chicago, Ill., assignor to Armour and Company, Chicago, Ill., a corporation of Illinois Application May 25, 1934, Serial No. 727,546

19 Claims. (Cl. 260—124)

This invention relates to processes of converting higher fatty acids and it comprises processes wherein a higher fatty acid, its esters, or anilides, are catalytically decomposed in the presence of carbocyclic amine to yield useful products.

A few processes have been described hitherto for making useful products from higher fatty acids, such as stearic, palmitic, lauric and the like. It has, for instance, been suggested to "crack" the fatty acids whereby aldehydes and various complex substances are formed in small amounts, these processes generally having for their object the manufacture of more valuable materials from the relatively cheap and abundant fatty acids. However, these prior processes have numerous disadvantages. Very small amounts of useful products are formed. The decomposition, or cracking, is so drastic that large quantities of tars, polymerized products, gums, resins, etc. are produced, none of which have any commercial value. Prior attempts have invariably resulted in the formation of polymerized products which poison the catalyst and render it useless. Moreover, the formation of coke has been a common experience and the coke likewise collects on the catalyst, choking it, so that after a relatively short time the catalyst must be renewed and the apparatus cleaned of carbonized residues.

All of these prior attempts result in an actual decomposition or "cracking" of the long hydrocarbon chains structure of the fatty acid. This is advantageous because products of lower molecular weight having greater value and utility are obtained. But, as stated, no one has hitherto been able to control the extent of the cracking reaction. That is to say, the cracking hitherto practised has always resulted in the formation of major quantities of undesirable by-products such as tars, pitches, polymerized products, and resins. Nevertheless a pyrolitic process which could be made to yield major quantities of desirable and useful products from the higher fatty acids is of economic significance in this art.

In my prior application, Serial No. 720,454, filed April 13, 1934, I have described a method by which this cracking can be controlled to such an extent that no resins, tars, polymerized products, coke, and other undesirable products are formed. In that application, I describe cracking fatty acids, their esters, or nitriles in the presence of ammonia or an aliphatic amine, the ammonia or amine acting as a "protective" agent to prevent the formation of polymers, tars, and coke. The discovery therein described is of great practical significance since it enables me to obtain useful products from the higher fatty acids in major quantities and with an entire avoidance of polymerized, undesirable substances.

In the present invention, I have extended the discoveries first described in my earlier application and have found that the protective action is not confined to ammonia and the aliphatic amines. I have now discovered that the aromatic and cyclic amines, generally referred to as carbocyclic amines, exert a similar protective action during the catalytic cracking of the fatty acids. Moreover, I find that hydrocarbons and low-boiling nitrogen compounds of great utility in the arts are also obtained.

Generally speaking, the process of the present invention comprises passing a volatilized fatty acid compound, which can be the fatty acid itself, or an ester thereof, or an anilide thereof, through a dehydrating catalyst maintained at a cracking temperature in the presence of an aromatic or cyclic amine. If aniline be used as the protective agent, I find that anilides of the higher fatty acids are first formed and that these anilides thereafter crack in the presence of aniline to form low-boiling nitrogen compounds. In addition, hydrocarbons of terpene-like character also result. Accordingly, one specific embodiment of my invention comprises starting with the anilide of a higher fatty acid and subjecting the anilide to catalytic cracking in the presence of an aromatic amine or cyclic amine.

In order to illustrate my process in detail and to simplify understanding, I have, on the attached sheet of drawings, shown a typical apparatus set-up useful in carrying out my process. The showing is intended to be diagrammatic.

Referring to the drawing, 1 is a reaction chamber or tube containing a catalytic material. This tube must be heated and I have shown a conventional set of heating coils surrounding the tube, these being indicated at 2. The whole is encased in a heat insulating cover 3. Reaction tube 1 is shown in broken section to reveal catalytic material 4 contained therein.

An inlet 5 conducts volatilized higher fatty acids or esters thereof to the catalyst tube. This inlet has a branch 6 for recycling reaction products as will be described. Inlet 7 may be used for the introduction of amine (vaporized) or, as described later on, both the fatty acid and the amine can be introduced through 5. When desired an inert gas can be introduced through 7. This serves to build up a pressure in the catalyst zone but ordinarily this is not necessary.

Outlet 8, at the bottom of the reaction tube conducts reaction products to receiver 9 provided with a draw-off outlet 10 and an outlet 11. Outlet 11 leads to an air or water-cooled condenser 12. Products condensed in 12 collect in receiver 13 also having a draw-off outlet 14 and outlet 15 leading to condenser 16. Condenser 16 is advantageously chilled by a brine solution and products condensed therein collect in receiver 17 having draw-off outlet 18 and vapor outlet 19.

Products collected in receivers 9 and 13 can be recycled back to the reaction tube by means of recycle lines 20 and 21 for purposes to be described. Uncondensed vapor leaving receiver 17 can be recycled back through line 22.

The arrangement of receivers 9, 13 and 17 together with condensers 12 and 16 constitutes a kind of fractionating device to roughly fractionate the products into three fractions according to boiling points. However, instead of using the arrangement shown I can, by inserting a condenser between outlet 8 and receiver 9 collect all the product in receiver 9 and fractionate it apart from the apparatus shown. This is done in ways well-known.

I shall first describe my process as applied to the conversion of the alkyl esters of the higher fatty acids, this being the more usual raw material with which I start.

Among the esters which I can use are:

Methyl, ethyl, propyl and butyl esters of stearic, palmitic, lauric, oleic, linoleic and myristic acids.

Generally I use a mixture of such esters, the mixture being conveniently obtained from lard by saponifying the lard with sodium hydroxide, converting the sodium salts of the acids to free acid by treatment with hydrochloric acid, and then esterifying the acids with ethyl alcohol. Such a mixture of esters is advantageous because the source of the acids is cheap and abundant. And in the appended claims I mean the expression "alkyl esters of higher fatty acids" to include esters of this type; and by "higher fatty acids" I generically cover acids having six or more carbon atoms.

The ester to be used is first mixed with an aromatic or cyclic amine in any convenient way. The mixture is then volatilized and conducted to the reaction chamber 1 wherein it contacts with catalyst material 4. Instead of mixing the amine and ester together, I can vaporize each separately and introduce the vapors of the ester through 5 and the amine through 7. I find it more convenient to preliminarily mix the two together and volatilize the mixture in any suitable way, advantageously in a distilling vessel, not shown.

The mixture of volatilized ester and amine at atmospheric pressure, passes through catalyst material 4 which is heated to a high temperature. This temperature ranges from about 400° C. to 600° C. and is sufficiently high to "crack" the carbon chain of the ester. If the temperature is allowed to fall much below 400° C. cracking does not occur. My process is operated within the cracking temperature range. It is not concerned with the simple conversion of higher fatty acids, or their alkyl esters to corresponding anilides (when aniline is used). It is old for instance, to pyrolytically treat fatty acids in the presence of aniline and a dehydrating catalyst at temperatures of about 350° C. But this yields products consisting almost wholly of anilides of the acid treated. Stearic acid, for instance, yields stearanilide. My process is to be distinguished from this prior practice in that I treat at higher temperatures. The temperatures I use, although probably giving anilides of the corresponding fatty acids as intermediate products, actually lead to a cracking of the carbon chain and hence yield products differing greatly from the simple higher fatty acid anilides.

Catalyst material 4 is a dehydrating catalyst. I find it best to use a catalyst composed of aluminum oxide baked on activated charcoal. I have found that oxides of the metals of the third, fourth and eighth group of the periodic system are effective. These include aluminum oxide, thorium oxide, cerium oxide, iron oxide and osmium oxide, and are classed as dehydrating catalysts. There are many ways of preparing them. Usually activated carbon is soaked in the nitrate of the metal, such as aluminum nitrate, dried, ignited and the nitrate decomposed in a stream of nitrogen.

I have stated above that in my process, while I succeed in cracking the higher fatty acid, I avoid the formation of undesirable products, such as tars, resins and condensation products polymers, by conducting the pyrolysis in the presence of an aromatic or cyclic amine. I have discovered that both classes of substances act as "protective" materials to prevent condensation, polymerization, resin formation, carbonization, etc. In addition, they react with the fatty acid ester and thus yield organic nitrogen compounds. The protection afforded by the amine is so great that no coke or polymerized material forms on the catalyst even after long continuous use. This indicates that the polymerization of the cracked hydrocarbon chains is effectively prevented by the amine. Among the amines which I can use are phenylamines such as aniline, the three toluidines, phenylalkylamines such as monomethyl aniline, dimethyl aniline, ethyl aniline, diphenyl amine and benzidene. The naphthylamines are also useful; alpha and beta naphthylamine, and naphthylene diamine, are suitable. Generally I prefer to use an aromatic amine which contains a free hydrogen attached to the nitrogen since I believe that this free hydrogen plays some definite part in the protective action, and in "activating" the catalyst used. However, tertiary aromatic amines can be used. The hetero-cyclic amines such as carbazol are also useful. In general the boiling point of the amine should be below the temperature used in the cracking reaction and I have investigated, and used, a large number of carbocyclic amines boiling not higher than about 400° C. Those listed herein are representative of the class of phenyl amines, naphthylamines and heterocyclic amines.

I shall now describe my invention with especial reference to the use of aniline, it being understood however, that other carbocyclic amines can be used as protective agents.

I mix 2500 parts of ethyl stearate with 2500 parts of aniline. The mixture is then volatilized and the vapors, at atmospheric pressure, passed through catalytic material 4 maintained at a temperature of 400° C. to 600° C. This is within the cracking range. The catalyst is aluminum oxide precipitated on activated carbon. Most of the reaction product is condensed and collected in receiver 9 and it is slightly darker than the original starting mixture. Very low boiling products, mostly hydrocarbons of terpene-like character, can be condensed in receivers 13 and 17. When using alkyl esters of the higher fatty acids, not much condensable material is obtained in these two receivers because most of the product condenses in 9. I point out later on that when starting with the fatty acids themselves, more "lighter ends" are obtained in 13 and 17.

In the present example, the major quantity of product, as stated, collects in receiver 9, material not condensed herein is advantageously recycled back to the cracking zone through line 20. Product collected in 9 is readily worked up for the isolation and recovery of its constituents. Thus I can steam distill it or, with equal advantage, first subject it to extraction with dilute hydrochloric acid. This serves to isolate and recover unreacted aniline for re-use. I find it best to use an excess of aniline and that is why I take steps to recover the excess for re-use. The remainder of the product is mostly nitrogen-containing compounds which are non-basic and hence not extractable with the acid. Based on the quantity of ethyl stearate used as the starting material, I find that about 75 per cent of it is converted to non-basic nitrogen containing compounds, small quantities of esters of fatty acids lower than stearic (thus indicating cracking of the stearic acid molecule) and smaller quantities of ketones. The non-basic nitrogen compounds obtained are products of the cracking of stearanilide, for I have been able to show that stearanilide is first formed in the reaction and that this decomposes to give non-basic nitrogen compounds of lower boiling point. These valuable materials can be isolated from the reaction products by distillation, advantageously under vacuum, as described in my earlier application. The compounds are useful in many relations, in insecticides, as starting materials for medicinal compounds etc.

As pointed out above, when ethyl stearate alone is subjected to cracking conditions in the presence of a dehydrating catalyst, large quantities of polymers, gums, condensation products, and coke are formed. But I find that in the above example none of these undesirable substances are formed and this indicates the profound protective effect of the aniline.

When starting with stearic acid itself, generally similar results are obtained. Thus I can prepare a mixture of equal parts of stearic acid and aniline, volatilize the mixture and pass it over an aluminum oxide catalyst at 500° C. 1000 parts of such a starting mixture gives about 900 parts of product in receiver 9. The rest is lower boiling and can be collected in receivers 13 and 17. Of that collected in 9, about 44 percent is volatile with steam and consists largely of aniline together with small amounts of hydrocarbons and water. The aniline can, of course, be returned to the process for re-use. The residue not volatile with steam, and amounting to about 56 percent of the total product, contains some stearic acid, some stearanilide, and considerable quantities of low-boiling nitrogen-containing compounds derived from the decomposition of the stearanilide.

No tars, gums, polymerized products, or coke are formed, thus showing that the presence of the aniline inhibits the drastic decomposition coupled with polymerization to such undesirable substances.

Instead of using pure stearic acid, or pure alkyl esters of the higher fatty acids, I can start with a mixture of crude lard fatty acids, or a crude mixture of esters thereof. For example, I make up a mixture of equal parts of aniline and lard fatty acids. 1000 parts of such a mixture, when volatilized and passed over the catalyst at 500° C. gives me a product condensed in 9 of about 800 parts. The remainder can be collected in receivers 13 and 17. Of the product in 9, about 530 parts is volatile with steam and this steam-volatile fraction consists mainly of unreacted aniline, terpene-like hydrocarbons and water. About 400 parts of unreacted aniline can be recovered as such and returned for re-use. About 100 parts of the steam-volatile fraction are hydrocarbons of sweet-smelling, terpene-like character. This, itself, indicates considerable cracking of the fatty acids to desirable hydrocarbons and amounts to a conversion of about twenty percent of the fatty acids to hydrocarbons in a single pass through the catalyst. This is a respectable yield.

The non-volatile fraction in this example amounts to about 270 parts and consists of unreacted fatty acids, fatty acid anilides, and nitrogen-containing decomposition products, of the anilides. The fatty acid anilides themselves can be recovered for re-use.

Unsaturated fatty acids are also useful in my process. Thus I can start with 1000 parts of a mixture of equal parts of oleic acid and aniline, volatilize it and pass it over the aluminum oxide catalyst at 500° C. This gives me about 850 parts collecting in receiver 9. Of this, about 550 parts are volatile in steam and this steam-volatile fraction contains unreacted aniline, hydrocarbons and water. The non-volatile fraction contains unreacted oleic acid, the anilide of oleic acid, and low molecular weight, low-boiling, nitrogen-containing decomposition products. About 75 percent of the oleic acid introduced into the catalyst zone reacts.

Likewise I can start with the higher fatty acid esters of the polyhydroxy alcohols, such as lard itself. This is a mixed triglyceride.

In the above examples, the extent of cracking is largely shown by the amount of steam-volatile products obtained, deducting, of course, the quantity of aniline recovered as such. Generally, the larger the amount of steam-volatile fraction, the greater the actual cracking. In other words, the cracking in my process results in products of lower molecular weight and higher volatility compared with the starting materials. These lower molecular weight compounds are chiefly hydrocarbons and nitrogen-containing substances of lower molecular weight than the anilides of the fatty acids used. In addition, the extent of cracking is also shown by the amount of products recovered in receivers 13 and 17. Thus, in the example showing the use of oleic acid, but 850 parts of reaction product were collected in receiver 9, the remainder of the reaction products being condensed in both 13 and 17. Since these are extremely low boiling products, whereas the starting materials themselves are high boiling, it is evident that profound cracking of the fatty acid has occurred. And of equal, if not greater importance from the commercial point-of-view, is the entire absence of high-boiling polymers, resins, condensation products, gums and coke. Inspection of the catalyst and apparatus after a run reveals substantially no evidence of such undesirable products and this distinguishes my process in a major way from all prior proposals relating to the cracking of the higher fatty acids.

It is, of course, obvious, that in the commercial practice of my process I recover unreacted amine and fatty acid for re-use. That is why I have indicated recycle lines on the attached sheet of drawings. Ordinarily I do not convert all of the fatty acid, or its esters, to more valuable products in a single pass through the catalyst.

While I do not pretend to understand the actual mechanism of the cracking reaction in the presence of the amine, I do feel fairly confident that the first product formed is (when aniline is used) an anilide of the higher fatty acid. This anilide then cracks to yield hydrocarbons and nitrogen compounds of lower molecular weight than the anilide. Undoubtedly the reactions are obscure but the initial formation of an anilide seems fairly well established. I can, for instance, start with an anilide itself and crack it in the presence of a carbocyclic amine and get reaction products similar to those obtained when the starting materials are fatty acid and amine.

And while I have indicated that a number of different compounds are obtained in my process, it is not to be understood that this lessens the utility of the invention. Repeated passage of unreacted amine and fatty acid through the catalyst will ultimately convert all of the acid to more useful materials. The hydrocarbons obtained are very good solvents for oils, fats, waxes, etc. The nitrogen-containing compounds of low molecular weight are useful in making detergents of the amine type, as wetting out agents, insecticides, starting materials for the preparation of many organic compounds including medicinals, and the like.

The individual products obtained need not be isolated. Rough separation into unreacted fatty acid (or ester), unreacted amine, nitrogen compounds resulting from the cracking, and hydrocarbons, is sufficient for most purposes. The unreacted fatty acid and amine can be returned to the process. The mixture of cracked nitrogen compounds can be used as such in detergents, wetting out agents etc., and the hydrocarbon mixture need not be fractionated into components. It is in itself a suitable organic solvent for many things as pointed out above.

Although I have, in the foregoing specific examples, referred particularly to the use of an aluminum oxide catalyst, it is to be understood that equally satisfactory results are obtained when other dehydrating metal oxide catalysts are used. Thus, instead of aluminum oxide I can use oxides of thorium, cerium, osmium and iron, these being representative metal oxide catalysts of the metals of the third, fourth and eighth group. They are all known dehydrating catalysts and have been used hitherto in pyrolitic processes wherein dehydrating action is necessary. I generically define them as dehydrating catalysts in the appended claims.

Having thus described my invention, what I claim is:

1. In the process of pyrolitically treating higher fatty acid substances chosen from the group consisting of higher fatty acids, their esters, and anilides to form useful products, the step which comprises subjecting such substances to catalytic treatment at a cracking temperature in the presence of a solid dehydrating catalyst and an aromatic amine.

2. The process of converting higher fatty acids to useful products which comprises subjecting the higher fatty acid to catalytic conversion at a cracking temperature in the presence of a solid dehydrating catalyst and a volatilized aromatic amine.

3. The process of converting higher fatty acids to useful products which comprises subjecting an ester of the higher fatty acid to catalytic conversion at a cracking temperature in the presence of a solid dehydrating catalyst and a volatilized aromatic amine.

4. The process of preparing useful products from higher fatty acids which comprises volatilizing a mixture of a higher fatty acid and an aromatic amine and passing the mixture into contact with a solid dehydrating catalyst maintained at a temperature of about 400° C. to 600° C.

5. The process of preparing useful products from higher fatty acids which comprises volatilizing a mixture of an ester of a higher fatty acid and an aromatic amine and passing the mixture into contact with a solid dehydrating catalyst maintained at a temperature of about 400° C. to 600° C.

6. The process of preparing useful products from higher fatty acids which comprises volatilizing a mixture of lard fatty acids and an aromatic amine and passing the mixture into contact with a solid dehydrating catalyst maintained at a temperature of about 400° C. to 600° C.

7. The process of preparing useful products from higher fatty acids which comprises volatilizing a mixture of lard and an aromatic amine and passing the mixture into contact with a solid dehydrating catalyst maintained at a temperature of about 400° C. to 600° C.

8. The process of cracking higher fatty acids to yield useful products therefrom which includes cracking catalytically in the presence of an aromatic amine whereby the formation of tars and polymerized products is avoided.

9. The process of cracking higher fatty acids which comprises subjecting the higher fatty acid to the action of a solid dehydrating catalyst at a temperature of at least 400° C. in the presence of an aromatic amine.

10. The process of cracking higher fatty acids which comprises subjecting a higher fatty acid material, of the class consisting of higher fatty acids and their esters, to the action of a solid dehydrating catalyst maintained at a temperature of at least 400° C. in the presence of a phenylamine.

11. The process as in claim 10 wherein the amine is aniline.

12. In the catalytic cracking of higher fatty acid substances chosen from the group consisting of higher fatty acids and their esters, the method of preventing the formation of tars, resins, polymers and coke which comprises catalytically cracking said substances in the presence of an aromatic amine.

13. The process as in claim 12 wherein the amine is a phenylamine.

14. The process as in claim 12 wherein the amine is aniline.

15. In the catalytic pyrolysis of higher fatty acids and their esters to compounds of lower boiling point the method of preventing the formation of tars, resins, polymers, or other undesirable substances which comprises conducting the pyrolysis in the presence of an aromatic amine.

16. The process as in claim 15 wherein the amine is a phenylamine.

17. The process as in claim 15 wherein the amine is aniline.

18. The process of making useful products from higher fatty acids which comprises volatilizing ethyl stearate, admixing the volatilized stearate with aniline, and subjecting the mixture to the action of a solid dehydrating catalyst at a temperature of about 400° C. to 600° C.

19. The process as in claim 18 wherein the catalyst is aluminum oxide.

ANDERSON W. RALSTON.